United States Patent
Organek et al.

(10) Patent No.: US 6,675,943 B2
(45) Date of Patent: Jan. 13, 2004

(54) LUBRICATION SYSTEM FOR BALL RAMP CLUTCH SYSTEMS

(75) Inventors: Gregory J. Organek, Whitefish Bay, WI (US); David M. Preston, Clarkston, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/143,337

(22) Filed: May 9, 2002

(65) Prior Publication Data

US 2003/0209399 A1 Nov. 13, 2003

(51) Int. Cl.[7] ................................................ F16D 13/60
(52) U.S. Cl. ..................... 192/35; 192/48.2; 192/54.52; 192/113.34
(58) Field of Search .................. 192/35, 113.3, 192/113.34, 113.36, 103 F, 48.2, 54.52, 112

(56) References Cited

U.S. PATENT DOCUMENTS

| | | |
|---|---|---|
| 1,974,390 A | 9/1934 | Eason |
| 2,045,086 A | 6/1936 | Kastner |
| 2,091,270 A | 8/1937 | Colman |
| 2,605,877 A | 8/1952 | Winther |
| 2,649,941 A | 8/1953 | Doebeli |
| 2,738,045 A | 3/1956 | Mergen et al. |
| 2,816,636 A | 12/1957 | Weibel, Jr. |
| 2,861,225 A | 11/1958 | Mergen |
| 2,933,171 A | 4/1960 | Kraeplin |
| 2,937,729 A | 5/1960 | Sperr, Jr. |
| 3,000,479 A | 9/1961 | Mosbacher |
| 4,286,701 A | 9/1981 | MacDonald |
| 4,415,073 A | 11/1983 | Campbell et al. |
| 4,645,049 A | 2/1987 | Matsuda et al. |
| 4,718,303 A | 1/1988 | Fogelberg |
| 4,850,458 A | 7/1989 | Allan |
| 4,878,567 A | 11/1989 | Buckley et al. |
| 4,898,265 A | 2/1990 | Metcalf |
| 4,909,363 A | 3/1990 | Trommer |
| 5,070,975 A | 12/1991 | Tanaka et al. |
| 5,078,249 A | 1/1992 | Botterill |
| 5,092,825 A | 3/1992 | Goscenski, Jr. et al. |
| 5,106,349 A | 4/1992 | Botterill et al. |
| 5,160,004 A | 11/1992 | Scott et al. |
| 5,199,538 A | 4/1993 | Fischer et al. |
| 5,366,419 A * | 11/1994 | Oda ............................ 475/160 |
| 5,435,201 A | 7/1995 | Preston et al. |
| 5,441,137 A | 8/1995 | Organek et al. |
| 5,469,948 A | 11/1995 | Organek et al. |
| 5,485,904 A | 1/1996 | Organek et al. |
| 5,499,951 A | 3/1996 | Showalter |
| 5,505,285 A | 4/1996 | Organek |

(List continued on next page.)

FOREIGN PATENT DOCUMENTS

| | | |
|---|---|---|
| CA | 1 123 765 | 5/1982 |
| DE | 42 07 640 A1 | 9/1993 |
| GB | 2 235 957 B | 6/1993 |
| GB | 2 315 531 A | 2/1998 |

*Primary Examiner*—Saul Rodriguez
(74) *Attorney, Agent, or Firm*—Loren H. Uthoff Jr.

(57) ABSTRACT

An improved lubrication system for a ball ramp master clutch and a gear change transmission is disclosed where a lubricant pump is driven by the input shaft to a ball ramp mechanism which, when energized, applies a clamping force on a clutch pack where lubricant is supplied to the pump from a wet sump on the transmission and then lubricant is forced into the clutch assembly and also forced into the gear shaft transmission for eventual return into the sump for recirculation. In an alternate embodiment, a dry sump system is used where the oil flowing out of the transmission is pumped to dry sump where it is then recirculated to the pump.

3 Claims, 9 Drawing Sheets

U.S. PATENT DOCUMENTS

| | | |
|---|---|---|
| 5,528,950 A | 6/1996 | Organek et al. |
| 5,638,933 A | 6/1997 | Matsumoto et al. |
| 5,651,437 A | 7/1997 | Organek et al. |
| 5,713,445 A | 2/1998 | Davis et al. |
| 5,713,446 A | 2/1998 | Organek et al. |
| 5,802,915 A | 9/1998 | Organek et al. |
| 5,810,141 A | 9/1998 | Organek et al. |
| 5,819,883 A | 10/1998 | Organek et al. |
| 5,910,061 A | 6/1999 | Organek et al. |
| 5,911,643 A | 6/1999 | Godlew et al. |
| 5,947,857 A | 9/1999 | Organek et al. |
| 5,953,959 A | 9/1999 | Organek et al. |
| 5,954,173 A | 9/1999 | Sakai et al. |
| 5,960,916 A | 10/1999 | Organek et al. |
| 5,964,330 A | 10/1999 | Organek et al. |
| RE36,502 E | 1/2000 | Organek et al. |
| 6,041,904 A * | 3/2000 | Kuroda et al. ......... 192/113.34 |
| 6,082,504 A | 7/2000 | Organek et al. |
| 6,109,408 A | 8/2000 | Ikeda et al. |
| 6,250,445 B1 | 6/2001 | Davis |
| 6,318,532 B1 * | 11/2001 | Gassmann ................... 192/35 |

\* cited by examiner

LUBRICATION SYSTEM FOR BALL RAMP CLUTCH SYSTEMS

RELATED APPLICATIONS

This application is related to application U.S. Ser. No. 09/940,821, now issued patent U.S. Pat. No. 6,561,332 entitled Ball Ramp Clutch With Frictional Damping and U.S. Ser. No. 10/143,323 and U.S. Ser. No. 10/143,324 all of which are assigned to the same assignee, Eaton Corporation, as this application.

FIELD OF THE INVENTION

The present invention relates to a lubrication system for a vehicle driveline master clutch which utilizes a ball ramp mechanism to load a clutch pack and more specifically to a lubrication system for a vehicle driveline master clutch which utilizes a ball ramp actuator to load a clutch pack where the master clutch includes a lubrication pump to direct fluid flow from a transmission lubricant sump and direct it to the master clutch and through the gear change transmission.

PRIOR ART

Driveline master clutches commonly use a plurality of springs to clamp a friction disc to an engine flywheel. The clamping springs are normally disposed within a pressure plate assembly which is bolted to the flywheel. The friction discs are splined to rotate with a transmission input shaft which, when rotated, provides motive power to the driveline and wheels of the vehicle. A mechanical linkage operated by a driver is used to control the engagement and disengagement of the master clutch. The clutch is typically a dry clutch when no lubricant is required. The master clutch is typically located between a prime mover such as an internal combustion engine and a gear change transmission.

Efforts to automate the operation of the master clutch to eliminate the need for driver operation are currently underway. Thus, it is known to make use of a hydraulic actuator or an electric motor actuator to operate the master clutch release mechanism in response to a control signal generated by a control microprocessor in response to a multiplicity of sensor outputs which are used to determine the vehicle operating conditions and hence the desired operation of the master clutch. Furthermore, the use of a ball ramp actuator to operate a driveline master clutch is known in the art. U.S. Pat. Nos. 5,441,137; 5,469,948; 5,505,285; 5,651,437; 5,810,141; 5,910,061; 5,964,330; and RE 36,502 assigned to the same assignee as this application, all of which are hereby expressly incorporated by reference, disclose methods of using a ball ramp actuator to supply the clamping force on a clutch disc and could, in the alternative, be used to supply a release force against a clutch apply spring.

Typically, a ball ramp actuator is activated when an electrical current is supplied to a coil thereby producing an electromagnetic field in a coil pole which applies a retarding force to an armature which rotates with an input shaft. The rotating armature is nonrotatably connected to an annular control ring which has a plurality of control ramps or grooves formed in the face of the control ring which vary in axial depth. An annular activation ring which rotates with an output shaft has a like number of variable depth activation grooves formed therein which oppose those formed in the control ring where a corresponding number of rolling elements are trapped between the control and activation grooves. As a retarding force is applied to the control plate by the armature, the rotational movement of the control plate relative to the activation plate causes the rolling elements to simultaneously traverse the control grooves and the activation grooves thereby causing an increase in separation distance between the control and activation plates which is used to provide a clamping force on a device such as a clutch friction disc.

The prior art ball ramp actuators used in the operation of the master clutch or other driveline coupling system such as a differential or transfer case could be improved by improving the flow of lubricating/cooling fluid through the clutch. It would also be an advantage if the clutch lubrication system could make use of the same lubricant as that used in the transmission. It would also be an advantage if the lubrication system for the clutch could be used with either a dry or wet sump transmission lubrication system.

SUMMARY OF THE INVENTION

The present invention results in an improvement in the lubrication system of a ball ramp clutch which can be used in a variety of vehicle driveline applications to provide a clamping load on a frictional clutch pack. The present invention provides for the common use of the lubricant used in a gear change transmission for use in the ball ramp clutch irrespective of whether it is a dry sump or a wet sump system. This unique solution reduces package size, simplifies the lubrication system, reduces cost and improves performance.

The present invention improves the performance and durability of a ball ramp actuated master clutch assembly by eliminating the need for separate lubrication systems for the ball ramp clutch and the gear change transmission. The present invention also improves the performance and durability of a ball ramp actuated master clutch assembly by eliminating one-way clutches with the use of indexing plates to limit the relative rotational travel of the control ring and the actuation ring of the ball ramp actuator which is used to apply an axial clamping load on a clutch pack. One indexing plate limits the rotation of the control ring of the ball ramp mechanism, and a second indexing plate limits the rotation of the activation ring, thereby allowing unidirectional grooves to be used in the control ring and the activation ring. Using the indexing plates of the present invention, the ball ramp mechanism, when energized, can only further compress the clutch pack with clutch slippage thereby preventing any break in clutch engagement when the torque flow in the driveline reverses direction from a drive mode into a driven mode. The torque flow in the driveline is in a drive mode when the engine is supplying power to the input shaft of the clutch assembly and in a driven mode when the engine is absorbing power from the input shaft of the clutch assembly. The indexing plates do not always prevent rotation in an undesired direction as with the one-way clutches disclosed in U.S. Ser. No. 09/940,821 but may permit limited rotation in an undesired manner until the index plates hit against a respective stop formed on the control plate and the activation plate.

The present invention also results in an improvement in the operational characteristics of a ball ramp actuator which can be used in a variety of vehicle driveline applications to supply a clamping load to a frictional clutch pack. The present invention provides a unidirectional apply ball ramp function which applies the clutch irregardless of torque flow along with significantly increased frictional damping in the ball ramp mechanism itself to control and stabilize the ball ramp mechanism thereby improving the operation of the master clutch or other driveline device.

To improve the operation of the ball ramp mechanism, the stability is improved by significantly increasing the frictional damping using an intermediate plate disposed between the activation plate and the control plate where the intermediate plate rotates with the output shaft and hub and the activation plate rotates with the activation ring and the control plate rotates with the control ring. Either the activation plate or the control plate must slip relative to the intermediate plate (which rotates with the output shaft) for the ball ramp mechanism to increase the clamp load on the clutch pack. Note that the torque flow from the input shaft to the output shaft can be reversed so that the torque flows from the output shaft to the input shaft and the ball ramp clutch assembly will continue to provide the desired functionality.

One provision of the present invention is to provide a vehicle master clutch using a ball ramp actuator to load a clutch pack where the master clutch uses a common lubrication system with a gear change transmission.

Another provision of the present invention is to provide a vehicle master clutch using a ball ramp actuator to load a clutch pack where the master clutch includes an integral pump to pressure a lubricant flow within a ball ramp mechanism and clutch pack.

Another provision of the present invention is to provide a master clutch having a ball ramp mechanism to load a clutch pack where the lubrication system is pressurized using a gerotor pump mounted within the ball ramp master clutch which draws lubricant from a lubricant sump and supplies lubricant to both the clutch and a change gear transmission.

Still another provision of the present invention is to provide a ball ramp actuator to actuate a driveline master clutch which is joined to a gear change transmission, both the master clutch and the transmission having an improved lubrication system.

DETAILED DESCRIPTION OF THE PREFERRED EMBODIMENT

Figure 1:
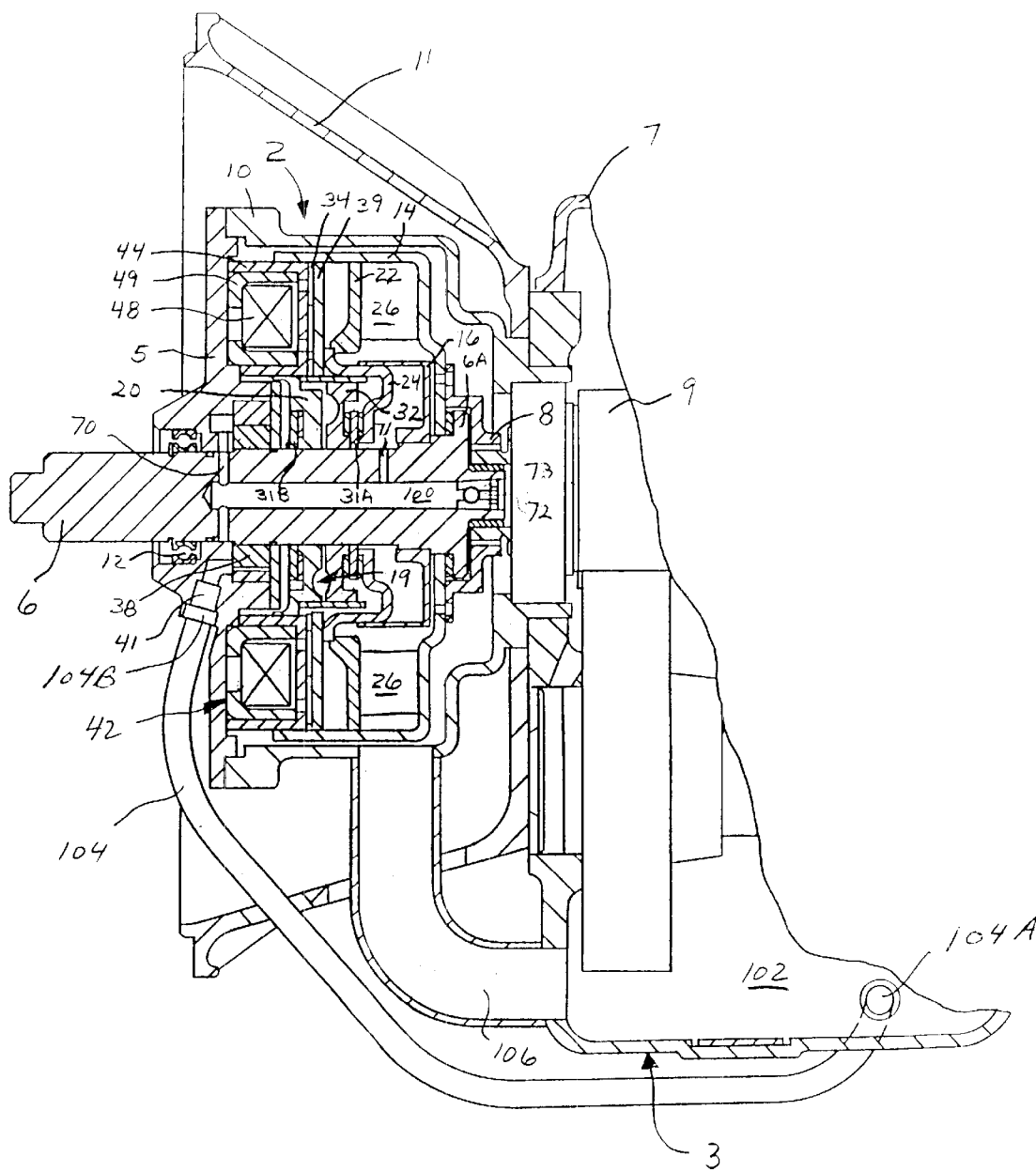
FIG. 1 is a cross-sectional view of a first embodiment of the lubrication system of the present invention using a wet sump.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Although primarily described for use in a vehicle driveline and more specifically as part of a master clutch/ transmission system the present invention can be used to rotationally connect any two rotatable shafts in response to an electronic control signal, using a common lubrication system between two or more devices. Such alternative devices could include differentials, engine retarders, transmission brakes, foundation brakes, inertia brakes, transfer cases and other devices.

Now referring to FIG. 1 of the drawings, a cross-sectional partial view of the lubrication system of the present invention is shown. A ball ramp clutch 2 is joined to a prime mover such as an internal combustion engine (not shown) through an input shaft 6 which is frictionally rotationally joined to an output shaft 8 using a ball ramp mechanism 19 to apply a compression load on a clutch pack 26 schematically illustrated in FIG. 1. The output shaft 8 is nonrotationally connected to the input shaft 9 of a gear change transmission 3. The housing 10 of the ball ramp clutch 2 is joined to a face plate 5 on one side and to a ball housing 11 and a transmission case 7 at its second side. The face plate 5 is supported by the input shaft 6 through bearing 12.

The lubrication system of the present invention is comprised of a lubrication wet sump 102 which is mounted to or part of the underside of the gear change transmission. A lubricant supply tube 104 has a first end 104A located within the sump 102. A second end 104B of the lubricant supply tube 104 is retained in a lubricant port 41 formed in the face plate 5. A lubricant pump 38 is positioned within the clutch assembly 2. As shown in FIG. 1, a gerotor type lubricant pump 38 is positioned to be driven by the input shaft 6. The lubricant residing in the sump 102 of the gear change transmission 3 is drawn up lubricant supply tube 104 by the pump 38 as it is rotated by the input shaft 6 which is connected to the crankshaft of the engine. The lubricant is pressurized by the pump 38 and forced into the lubricant feed ports 70 into the lubricant distribution channel 100 for distribution into the working elements of the clutch assembly 2 such as into the ball ramp mechanism 19 and into the clutch pack 26 through one or more secondary feed ports 71. The lubricant that is forced into the workings of the clutch assembly 2 is then allowed to flow back into the sump 102 through the drain 106.

The lubricant pressurized by the pump 38 is also routed through the lubricant distribution channel 100 to a check valve 73. The check valve 73 prevents the flow of lubricant through the check valve port 72 and into the transmission 3 until the pressure of the lubricant exceeds a pre-set value. Once the lubricant pressure exceeds this pre-set value, the lubricant flows into the inner workings of the transmission 3 such as the transmission input shaft 9 contained within transmission case 7 to lubricate the various rotating elements and eventually make its way back into the sump 102. Sump 102 is what is known in the art as a wet sump since it has a large open area to the inner workings of the transmission 3 and the lubricant simply drips or drains into the sump 102.

Figure 2:
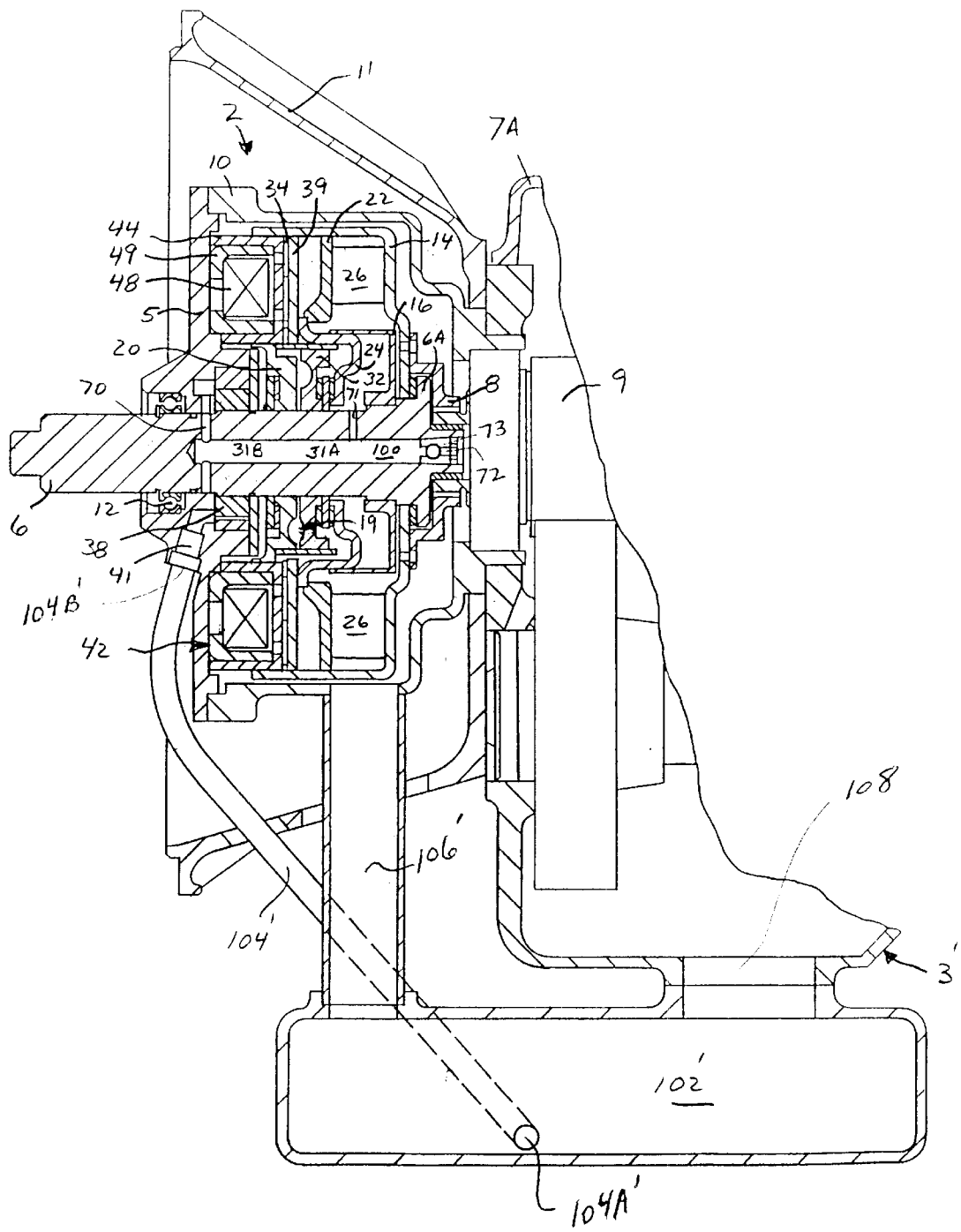
FIG. 2 is a cross-sectional view of a second embodiment of the lubrication system of the present invention using dry sump.

Now referring to FIG. 2, a cross-sectional view of a second embodiment of the lubrication system of the present invention is shown. FIG. 2 illustrates use of the lubrication system with a dry sump 102' where the lubricant is held in a separate container with no generally open top to the inner workings of the transmission 3'.

The lubrication system of the present invention is comprised of a lubrication wet sump 102' which is mounted to the underside of the gear change transmission 3'. A lubricant supply tube 104' has a first end 104A' located within the sump 102'. A second end 104B' of the lubricant supply tube 104' is retained in a lubricant port 41 formed in the face plate 5. A lubricant pump 38 is positioned within the clutch assembly 2. As shown in FIG. 1 a gerotor type lubricant pump 38 is positioned to be driven by the input shaft 6. The lubricant residing in the sump 102' of the gear change transmission 3' is drawn up lubricant supply tube 104' by the pump 38 as it is rotated by the input shaft 6 which is connected to the crank shaft of the engine. The lubricant is pressurized by the pump 38 and forced into the lubricant feed ports 70 into the lubricant distribution channel 100 for distribution into the working elements of the clutch assembly 2 such as into the ball ramp mechanism 19 and into the clutch pack 26 through one or more secondary feed ports 71. The lubricant that is forced into the workings of the clutch assembly 2 is then allowed to flow back into the sump 102' through the drain 106'.

The lubricant pressurized by the pump 38 is also routed through the lubricant distribution channel 100 to a check valve 73. The check valve 73 prevents the flow of lubricant through the check valve port 72 until the pressure of the lubricant exceeds a pre-set value. Once it exceeds this pre-set value the lubricant flows into the inner workings of the transmission 3' to lubricate the various rotating elements and eventually make its way back into the sump 102'. Sump 102' is what is known in the art as a dry sump since it has no large open area to the workings of the transmission 3'.

The lubricant eventually flows into a dry sump drain port 108 where it flows back into the dry sump 102'. Drain port 108 is relatively small in cross-sectional area as compared to the opening in the wet sump 102 shown in FIG. 1. In some systems, an auxiliary pump is used to pump the lubricant out of the transmission 3' and back into the dry sump 102'.

Figure 3:
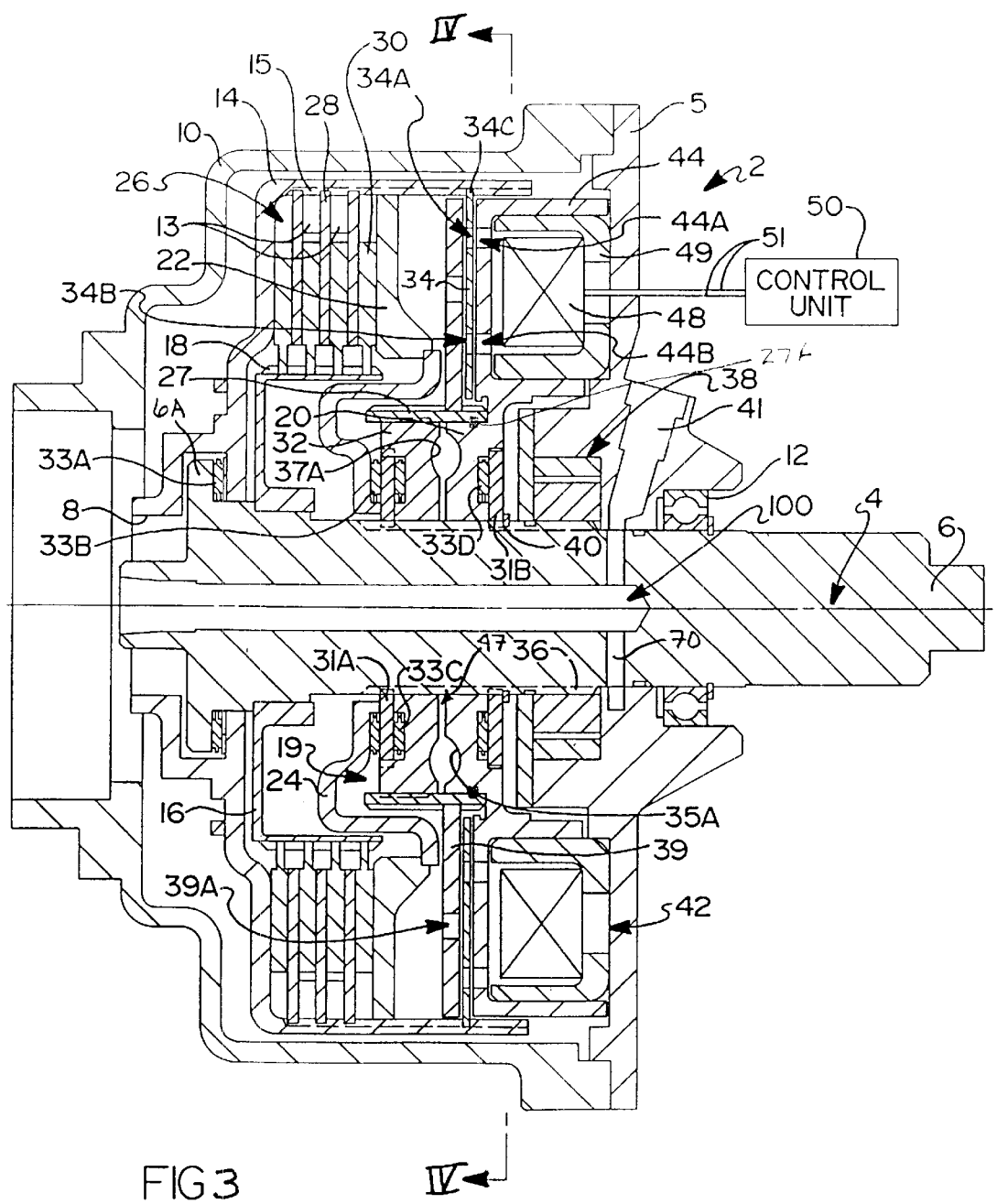
FIG. 3 is a cross-sectional view of the clutch assembly of the present invention.

Now referring to FIG. 3 of the drawings, a cross-sectional view of the clutch assembly 2 of the present invention is shown. An input shaft 6 which rotates about an axis of rotation 4 is normally connected to a power source such as an internal combustion engine (not shown). The clutch assembly 2 functions to frictionally rotationally link the input shaft 6 to an output shaft 8 which, for example, could be linked to the input shaft of a change gear transmission (not shown). In general, the elements which make up the clutch assembly 2 are annularly shaped and rotate about the axis of rotation 4. The face plate 5 is connected to and together with the housing 10 provides a containment structure for the operating elements and lubricating/cooling fluid of the clutch assembly 2. The face plate 5 is supported by the input shaft 6 through bearing 12. The clutch hub 14 is piloted on the input shaft 6 but is nonrotatably connected to the output shaft 8. The housing 10 can be attached to the case of a gear change transmission or other driveline rotational device (not shown). Splines 15 nonrotatably connect the output shaft 8 and clutch hub 14 to at least one driven disc 28 and also rotatably connect the hub 14 to the intermediate plate 34 through teeth 34C. Splines 18 formed on a drive hub 16 nonrotatably connect at least one drive disc 30 to the input shaft 6 since the drive hub 16 is attached to the input shaft 6. The clutch hub 14 is driven by the frictional interaction between the drive discs 30 and the driven discs 28. Annular wave springs 13 are placed between the driven discs 28 to provide a separation force so that the drive discs 30 and the driven discs 28 separate when the clutch assembly 2 is disengaged to reduce clutch drag in the clutch pack 26.

Figure 4:
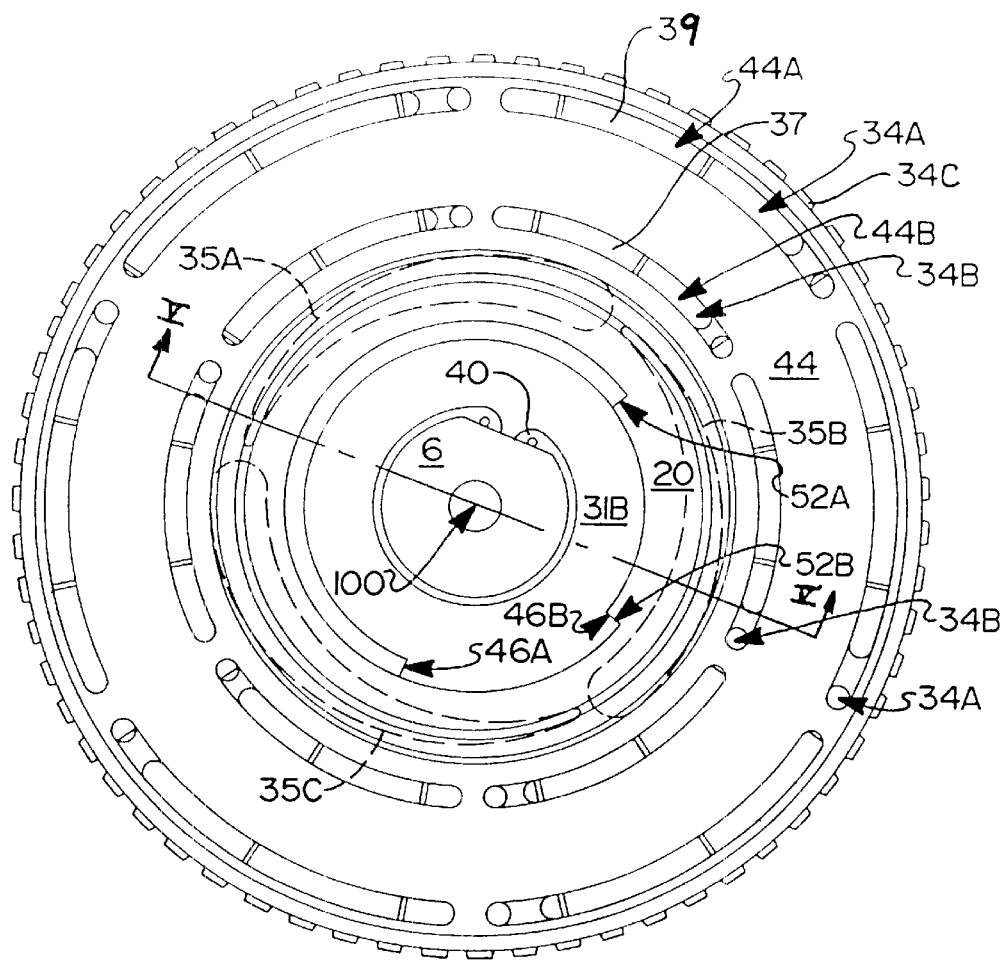
FIG. 4 is a sectional view of the clutch assembly of the present invention taken along line IV—IV of FIG. 3.

The ball ramp mechanism 19 is comprised of a control ring 20, an activation ring 32 and a plurality of rolling elements 45A, 45B, 45C (see FIGS. 3 and 4) positioned to engage and roll along opposed variable depth grooves 35A, 35B, 35C and 37A, 37B, 37C formed in both the control ring 20 and the activation ring 32, respectively (see FIGS. 3 and 4). As the control ring 20 is rotated relative to the activation ring 32, the rolling elements 45A, 45B, 45C transverse the opposed control ring grooves 35A, 35B, 35C and activation ring grooves 37A, 37B, 37C either increasing or decreasing the separation distance 47 between the control ring 20 and the activation ring 32 depending on the direction of the relative rotation.

The thrust bearings 33A, 33B, 33C and 33D axially position of various components contained in the clutch assembly 2. The input shaft flange 6A is axially located by the thrust bearing 33A. The first index plate 31A is axially supported through the thrust bearings 33B and 33C and the control ring 20 is axially supported through the thrust bearing 33D acting against the second index plate 31B which contacts the snap ring 40.

The ball ramp mechanism 19 is comprised of a control ring 20, an activation ring 32 and a plurality of rolling elements 45A, 45B, 45C (see FIGS. 3 and 4) positioned to engage opposed variable depth grooves 35A, 35B, 35C formed in both the control ring 20 and variable depth grooves 37A, 37B, 37C formed in the activation ring 32. As the control ring 20 is rotated relative to the activation ring 32, the rolling elements 45A, 45B, 45C (see FIGS. 3, 4 and 5) transverse the opposed control ring grooves 35A, 35B, 35C and activation ring grooves 37A, 37B, 37C thereby either increasing or decreasing the separation distance between the control ring 20 and the activation ring 32 depending on the direction of the relative rotation. The second index plate 31B limits rotation of the control ring 20 when the first index step 46A contacts the first control stop 52A or when the second index step 46B contacts the second control stop 52B. Thus, as shown in FIG. 2, the maximum rotation of the control ring 20 relative to the second index plate 31B is approximately 240 degrees. Since the second index plate 31B is nonrotatably fixed to the input shaft 6, through splines 36, the maximum relative rotation of the control ring 20 relative to the input shaft 6 is also limited by the second index plate 31B. In a similar manner to the operation of the second index plate 31B, the first index plate 31A limits the rotation of the activation ring 32 relative to the input shaft 6 when the first index step 54A contacts the first activation stop 56A (see FIG. 5). With the use of the index plates 31A and 31B, the ball ramp mechanism 19 is activated whenever there is a speed differential between the input shaft 6 and the output shaft 8 irregardless of the direction of the torque flow through the clutch assembly 2 even though the control plate grooves 35A, 35B, 35C and the activation plate grooves 37A, 37B, 37C are unidirectional. A second index plate 31B contacts thrust bearing 33D which, in turn, contacts the control ring 20. Both the first and second index plates 31A, 31B are nonrotationally coupled to the input shaft 6 with splines 36.

The pressure plate 22 is attached to the activation extension 24. As the activation plate 32 is displaced to the right by an increase in separation distance between the control ring 20 and the activation ring 32, the clutch pack 26 is squeezed by the pressure plate 22 and the drive discs 30 frictionally contact and are frictionally coupled to the driven discs 28. In this manner, where the ball ramp mechanism 19 is energized, the input shaft 6 is frictionally rotationally coupled to the output shaft 8.

The axial thrust of the clutch hub 14 is borne by the thrust bearing 33A which rides against the input shaft 6. The activation extension 24 is axially positioned against the thrust bearing 33B which, in turn, contacts a face of the first index plate 31A. A thrust bearing 33C is positioned between the first index plate 31A and the activation ring 32.

The intermediate plate 34 is splined to the clutch hub 14 to rotate therewith but allowed to move in an axial direction. The intermediate plate 34 is interposed between an activation plate 39 and an armature 44 where the armature 44 is attached to the control ring 20 and thus its rotation relative to the input shaft 6 is also limited by the second index plate 31B. Intermediate plate 34 is connected to the output shaft 8 through the clutch hub 14 while the activation ring 32 and the control ring 20 are through the steps 46A, 46B, 54A, 54B and stops 52A, 52B, 56A, 56B keyed to the input shaft 6 via the index plates 31A, 31B.

The activation ring 32 is splined to rotate with the slide sleeve which is splined to rotate with the activation plate 39. The activation ring 32 can rotate and axially move relative to the input shaft. 6. Also, the control ring 20 can rotate and axially move relative to the input shaft 6 and relative to the activation plate 39. Both the control ring 20 and the activation ring 32 are limited in their degree of rotation by the index plates 31B and 31A respectively which are splined to the input shaft 6. Index plate 31A is trapped between the thrust bearings 33B and 33C and limits the rotation of the activation ring 32 relative to the input shaft 6. Index plate 31B is trapped between the thrust bearing 33D and snap ring 40 thereby fixing the axial position of the control ring 20.

The coil assembly 42 is comprised of a multiple turn coil 48 which is partially surrounded by and attached to a stator 49. Both the coil 48 and the stator 49 remain stationary relative to the housing 10 where the stator 49 is attached to the face plate 5. The armature 44 is attached to and rotates with the control ring 20 with a slight clearance between the armature (control plate) 44 and the stator 49. For purposes of this application the term "armature" shall be equivalent to the term "control plate". When the coil 48 is electrically energized by the control unit 50 through signal wires 51, an electromagnetic field is established in the stator 49 which is transferred to the armature 44 which, in turn, electromagnetically attracts the intermediate plate 34 and the activation plate 39. The armature 44, intermediate plate 34 and activation plate 39 can have friction material attached to at least one of their respective faces where they make contact with an adjacent element.

As the electrical current in the coil 48 is increased by the control unit 50, the strength of the electromagnetic field induced in the armature 44 is increased and the electromagnetic attraction between the armature 44 (also termed a "control plate") and the intermediate plate 34 and the activation plate 39 increases. If the input shaft 6 is rotating at a slower speed the output shaft 8, this produces a torque on the control ring 20 and the activation ring 32 in either direction as needed to further activate the ball ramp mechanism 19 thereby increasing the separation distance between the control ring 20 and the activation ring 32 to axially move the pressure plate 22 and increase the clamp force on the clutch pack 26. The control ring 20 can rotate in either direction relative to the activation ring 32 and the clamping load on the clutch pack 26 will be increased due to the rotational limiting action of the first and second index plates 31A and 31B. Slip sleeve 27 functions such that when activation ring 32 axially moves to clamp the clutch pack 26 it doesn't drag activation plate 39 with it. Thus, slip sleeve 27 allows activation ring 32 to move axially independently of activation plate 39 but joins the two in a rotational sense. The slip sleeve 27 is retained axially relative to control ring 20 by sump ring 27A but allowed to rotate relative to control ring 20.

Flux slots 44A and 44B are formed in the armature 44 to enhance the magnetic field properties of the coil assembly 42. Likewise, magnetic flux slots 34A, 34B are formed in the intermediate plate 34 and one central flux slot 39A is formed in the activation plate 39. These flux slots 44A, 44B, 34A, 34B and 39A combine to enhance the magnetic flux properties of the armature 44, the intermediate plate 34 and the activation plate 39 when the coil 48 is electrically energized. In a certain mode of operation, the activation plate 39 slips relative to the intermediate plate 34 and in another mode of operation the armature 44 slips relative to the intermediate plate 34. In operation, that slippage can switch between the two modes.

A fluid pump 38 functions to force a lubricant into the clutch assembly 2 for cooling and lubrication of the various components. The fluid pump 38 can be a gerotor pump as shown or any other type of suitable fluid pump device. The lubricant used for a gear shift transmission could be used for this purpose when the fluid pump 38 also functions to force lubricant into various parts of the transmission as part of a dry sump or wet sump lubricating system. The fluid pump 38 provides a flow of lubricating and cooling lubricant to the clutch assembly 2 which is routed from port 41 into the lubricant distribution channel 100 through the lubricant feed ports 70. The lubricant distribution channel 100 distributes the fluid to the various components of the clutch assembly 2. The fluid port 41 allows lubricant to flow into the fluid pump 38.

Now referring to both FIG. 3 and FIG. 4 of the drawings, where FIG. 4 is an elevational view of a portion of the clutch assembly 2. The elevational view of FIG. 4 is taken looking into the armature 44 from the right side to the left with the faceplate 5 and coil 48 removed from the clutch assembly 2. Slots 44A and 44B formed in the armature 44 are clearly shown in this view. Also, more clearly shown are portions of the corresponding slots 34A and 34B formed in the intermediate plate 34.

Figure 5:
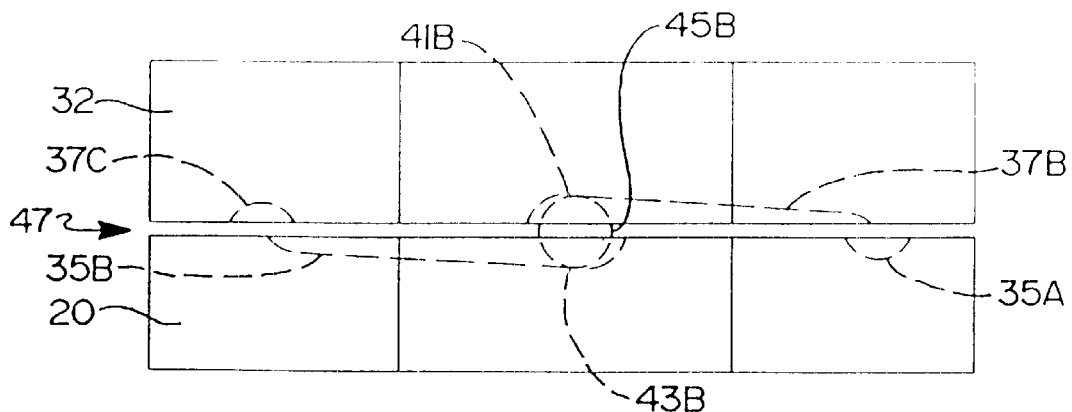
FIG. 5 is an illustrative partial view of the ball ramp mechanism in a nonactivated state taken along line V—V of FIG. 4.

In a similar manner to the operation of the second index plate 31B, the first index plate 31A limits the rotation of the activation ring 32 relative to the input shaft 6 when the first index step 54A contacts the first activation stop 56A (see FIG. 5). With the use of the index plates 31A and 31B, the ball ramp mechanism 19 is activated whenever there is a speed differential between the input shaft 6 and the output shaft 8 irregardless of the direction of the torque flow even though the control plate grooves 35A, 35B, 35C and the activation plate grooves 37A, 37B, 37C are unidirectional. Activation plate 39 is rotationally joined to the input shaft 6 via the index plate 31B which in one mode, is against a stop 52A and the control ring 20 and the activation ring 32 are positioned such that the rolling elements 45A, 45B, 45C are at the bottom of their respective grooves while the second index plate is on its stop 56B but in the opposite direction.

Now referring to FIG. 5 of the drawings, more clearly illustrated are the control grooves 35A, 35B, 35C formed in the control ring 20 and the activation grooves 37A, 37B, 37C formed in the activation ring 32. The control grooves 35A, 35B, 35C at least partially oppose the activation grooves 37A, 37B, 37C and both are of variable depth increasing from one end to the other and extending in opposite relative directions. Rolling elements 45A, 45B, 45C simultaneously contact and roll along respective opposed control grooves 35A, 35B, 35C and activation grooves 37A, 37B, 37C. The rolling elements 45A, 45B, 45C are shown in FIG. 3 in a nonactivated position where each contacts a respective control and activation groove 35A, 35B, 35C; 37A, 37B, 37C at their lowest depth (and minimum overlap) thereby minimizing the axial separation distance 47. As the ball ramp mechanism 19 is activated by electronically energizing the coil 48, assuming there exists slippage in the clutch pack 26, the control ring 20 moves counter-clockwise relative to the activation plate 32 thereby causing the rolling elements 45A, 45B, 45C to transverse the three respective pairs of opposed variable depth control grooves 35A, 35B, 35C and activation grooves 37A, 37B, 37C. As the control plate 20 continues to rotate relative to the activation plate 32, the separation distance 47 increases thereby increasing the clamp force on the clutch pack 26.

FIG. 5 shows the ball ramp mechanism 19 in a nonactivated state and FIG. 4 shows the ball ramp mechanism 19 in an activated state at about fifty percent travel. In FIG. 3, the rolling element 45B is positioned at the maximum depth of both the control groove 35B and the opposed activation groove 37B and the separation distance 47 is at a minimum. Reference point 41B is on the activation groove 37B and reference point 43B is on the control groove 35B for use in comparison to their positions in FIG. 4.

Figure 6:
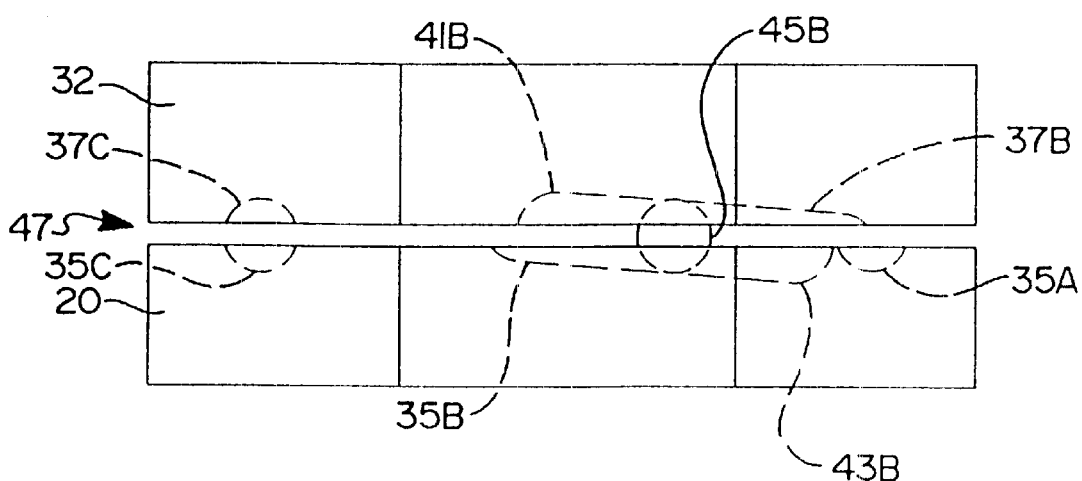
FIG. 6 is an illustrative partial view of the ball ramp mechanism in an activated state taken along line III—III of FIG. 4

In FIG. 6, the rolling element 45B has traversed both the control groove 35B and the activation groove 37B as the control ring 20 has been rotated relative to the activation ring 32. The separation distance 47 has increased since the rolling element 45B is now contacting a more shallow portion of both the control groove 35B and the activation groove 37B. The relative position of reference points 41B and 43B illustrate the relative rotation.

Figure 7:
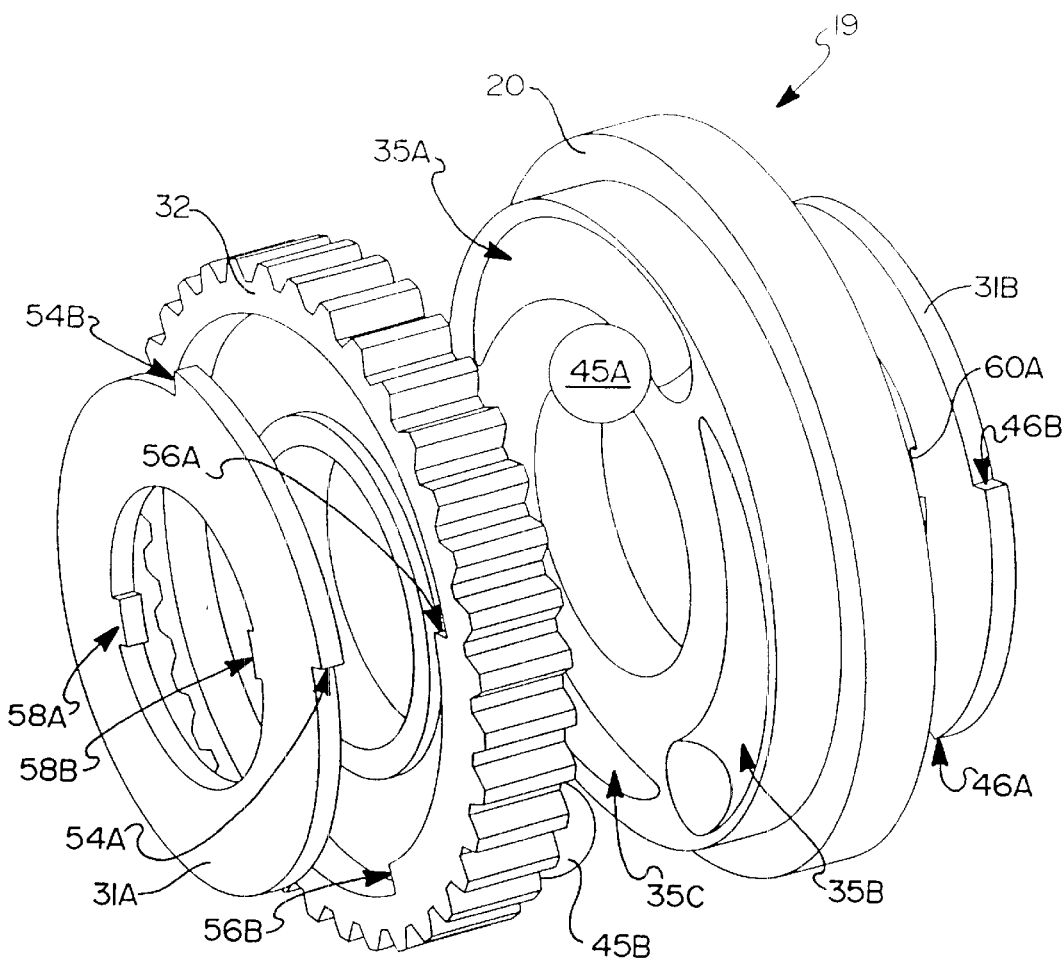
FIG. 7 is a perspective view of the ball ramp mechanism and the indexing plates of the clutch assembly of FIG. 3.

Now referring to FIG. 7, a partial perspective exploded view of the ball ramp mechanism 19 of the present invention is shown. The control ring 20 includes at least three control grooves 35A, 35B, 35C which vary in axial depth according to rotational location on the face of the control ring 20 and oppose respective variable depth activation grooves 37A, 37B, 37C (see FIGS. 3 and 4) with rolling elements 45A, 45B, 45C trapped between the respective grooves 35A, 35B, 35C; 37A, 37B, 37C. The grooves 35A, 35B, 35C and 37A, 37B, 37C are shaped and oriented such that upon rotation of the control ring 20 relative to the activation ring 32, the axial separation distance 47 between the control and activation rings 20, 32 is increased or decreased.

The rotation of the control ring 20 is limited by action of the second index plate 31B which is keyed to rotate with the input shaft 6 with keys 60A and 60B (not shown) which engage splines 36 (see FIG. 1). The rotation of the control ring 20 is stopped relative to the input shaft 6 when either the first index step 46A contacts the first control stop 52A or when the second index step 46B contacts the second control stop 52B (see FIG. 2).

Likewise, the rotation of the activation ring 32 is limited by action of the first index plate 31A which is also keyed to rotate with the input shaft 6 with keys 58A and 58B which engage the splines 36. The rotation of the activation ring 32 is stopped relative to the input shaft 6 when either the first index step 54A contacts the first activation stop 56A or when the second index step 54B contacts the second activation stop 56B. Note the rotational orientation of the first and second index plates 31A, 31B where the second index stop 52B of the second index plate 31B is in axial alignment with the first index step 54A of the first index plate 31A. Thus, looking from left to right, the activation ring 32 could rotate approximately 240 degrees clockwise and the control ring 20 could rotate approximately 240 degrees counterclockwise relative to the input shaft 6. The rolling elements 45A, 45B, 45C would traverse their respective control grooves 35A, 35B, 35C and activation grooves 37A, 37B, 37C (not shown) and thereby increase the axial separation distance 47 between the control ring 20 and the activation ring 32 as they rotate relative to each other. Activation plate 39 is rotationally joined to the input shaft 6 via the index plate 31B which in one mode, is against a stop 52A and the control ring 20 and the activation ring 32 are positioned such that the rolling elements 45A, 45B, 45C are at the bottom of their respective grooves while the second index plate is on its stop 56B but in the opposite direction. Intermediate plate 34 is connected to the output shaft 8 through the clutch hub 14 while the activation ring 32 and the control ring 20 are through the steps 46A, 46B, 54A, 54B and stops 52A, 52B, 56A, 56B keyed to the input shaft 6 via the index plates 31A, 31B. In a certain mode of operation, the activation plate 39 slips relative to the intermediate plate 34 and in another mode of operation the armature 44 slips relative to the intermediate plate 34. In operation, that slippage can switch between the two modes.

Figure 8:
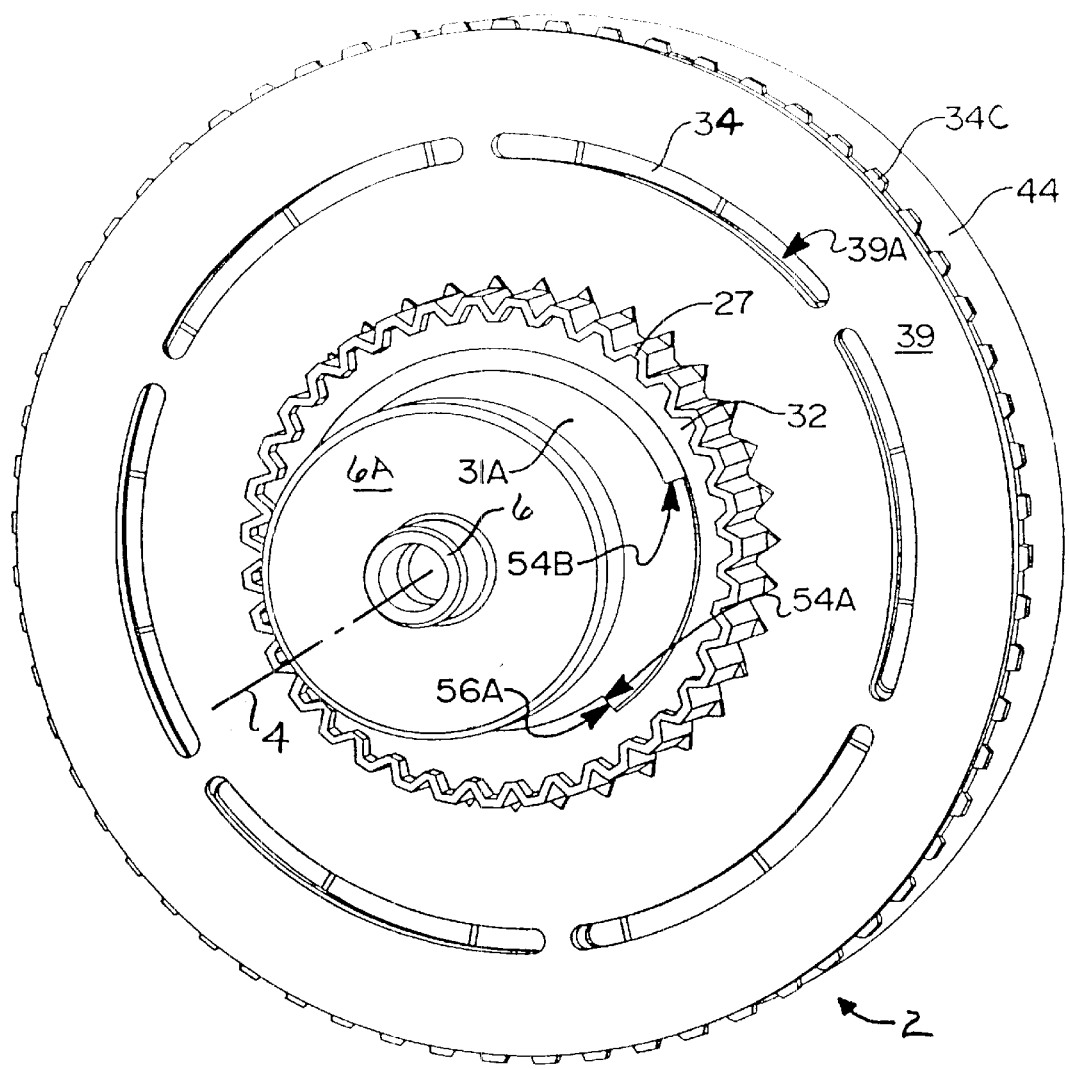
FIG. 8 is a perspective view of a portion of the clutch assembly of FIG. 3.

FIG. 8 is a partial perspective view of the clutch assembly 2 of the present invention looking from left to right as shown in FIG. 1. The axis of rotation 4 extends through the clutch assembly 2 and through the centerline of the input shaft 6. Flange 6A is shown extending from the input shaft 6.

The slip sleeve 27 has a multiplicity of tooth shapes formed therein to engage the mating teeth formed in activation ring 32. Slip sleeve 27 functions such that when activation ring 32 axially moves to clamp the clutch pack 26 it doesn't drag activation plate 39 with it. Thus, slip sleeve 27 allows activation ring 32 to move axially independently of activation plate 39 but joins the two in a rotational sense. The slip sleeve 27 is retained axially relative to control ring 20 by sump ring 27A but allowed to rotate relative to control ring 20. The teeth 34C of the intermediate plate 34 extend to engage the splines 15 formed in the clutch hub 14. A small portion of the intermediate plate 34 is visible through the slot 39A formed in the activation plate 39. The outside surface of the armature 44 is also shown.

Figure 9:
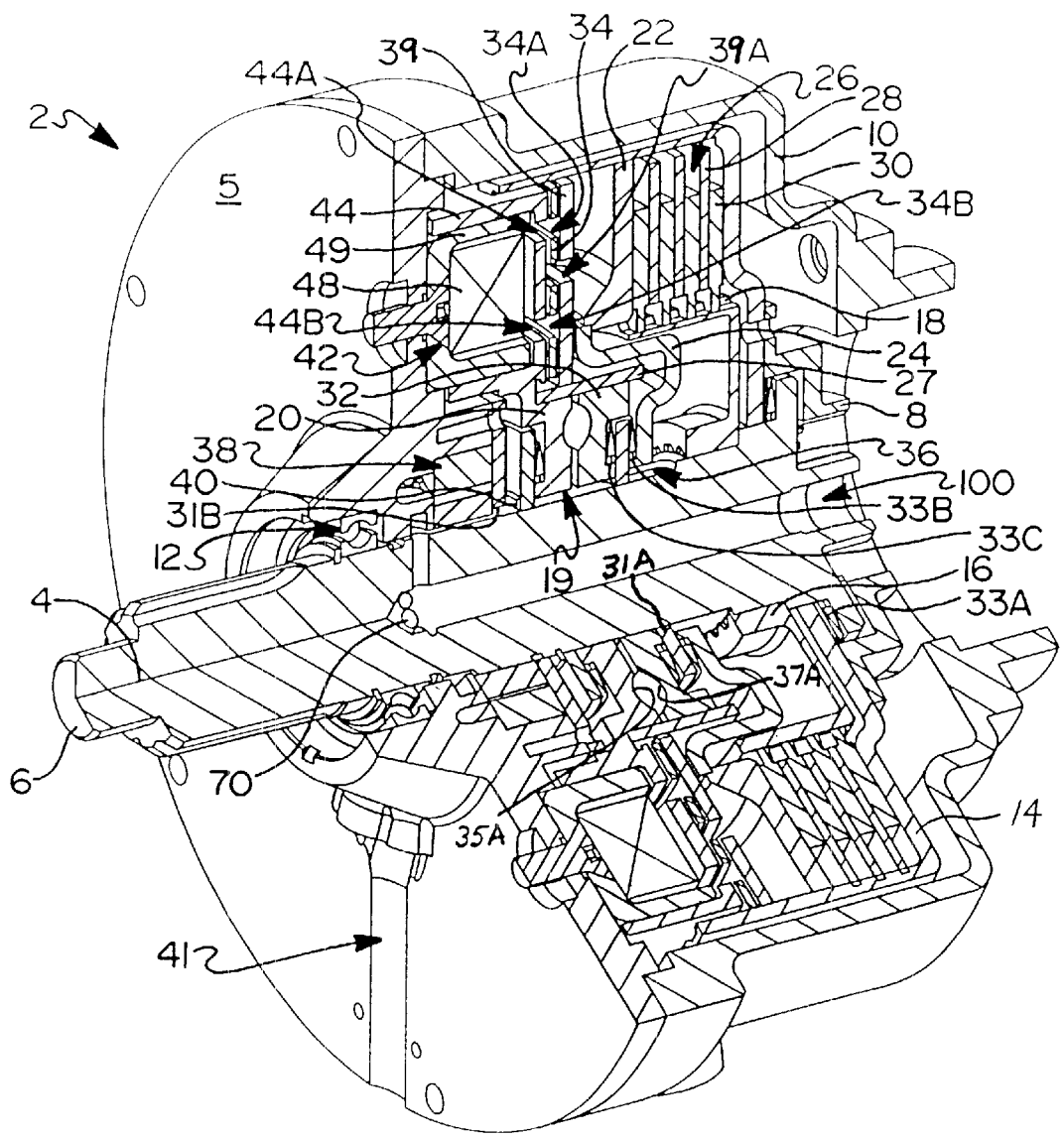
FIG. 9 is a sectional perspective view of the clutch assembly of the present invention.

Now referring to FIG. 9 of the drawings, a cross-sectional perspective view of the clutch assembly 2 of the present invention is shown. An input shaft 6 which rotates about an axis of rotation 4 is normally connected to a power source such as an internal combustion engine (not shown). The clutch assembly 2 functions to frictionally rotationally link the input shaft 6 to an output shaft 8 which, for example, could be the input shaft a change gear transmission. In general, the elements which make up the clutch assembly are annularly shaped and rotate about the axis of rotation 4. The face plate 5 is connected to and together with the housing 10 provides a containment structure for the operating elements and lubricating/cooling fluid of the clutch assembly 2. The face plate 5 is supported by the input shaft 6 through bearing 12. The clutch hub 14 is piloted but not connected to the input shaft 6 and can be nonrotatably connected to some type of driveline device such as a gear change transmission. The housing 10 can be attached to the housing of a gear change transmission (not shown) or other driveline device. Splines 18 formed on a drive hub 16 nonrotatably connect at least one drive disc 30 to the input shaft 6 since the drive hub 16 is attached to the input shaft 6.

Figure 10:
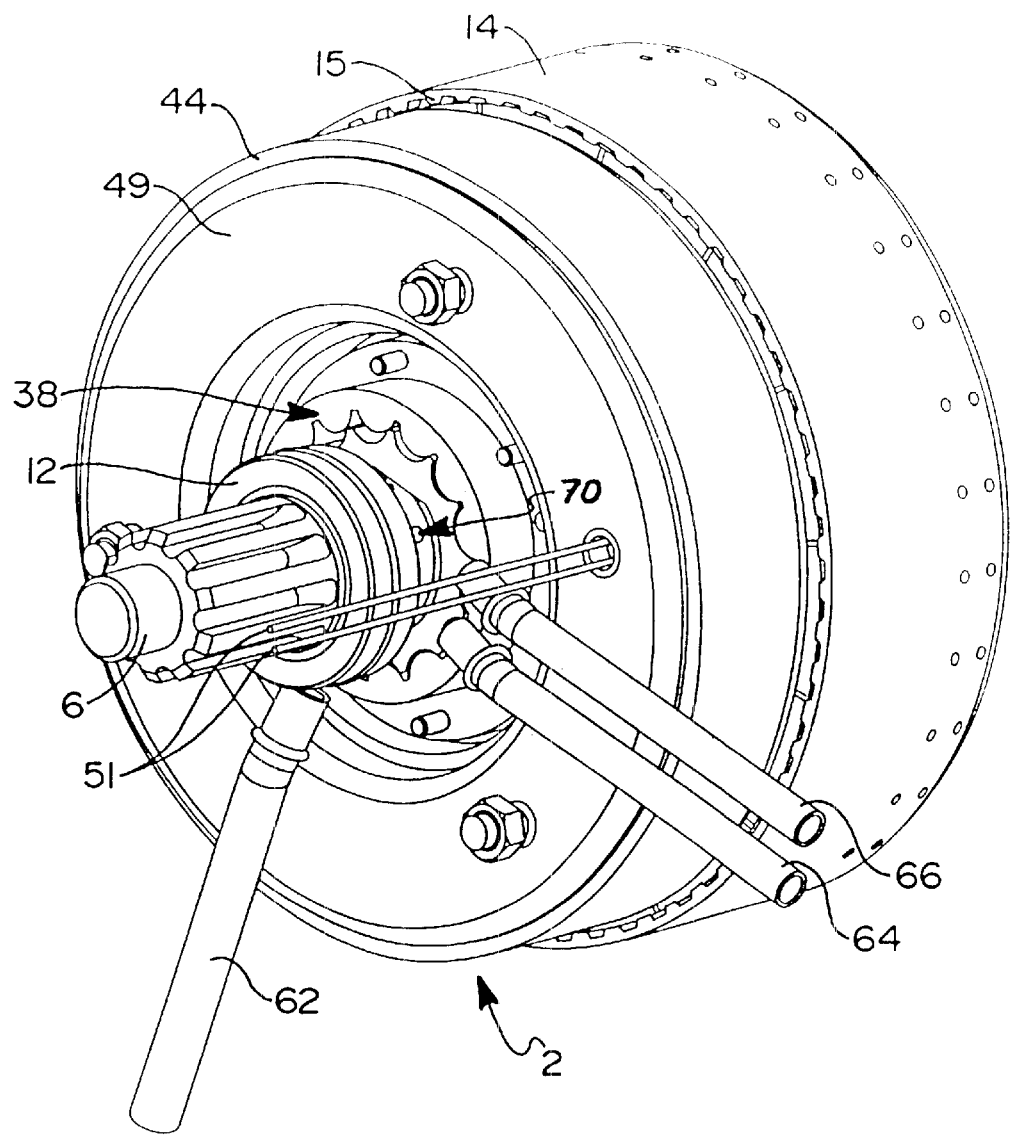
FIG. 10 is a partial perspective view of a third embodiment of the lubrication system of the present invention.

Now referring to FIG. 10 of the drawings, a partial perspective view of a third embodiment of the clutch assembly 2 of the present invention is shown which includes a heat exchanger. The face plate 5 of the clutch assembly 2 is partially cut away to more clearly show the fluid pump 38 which pumps lubricant from a lubricant sump through lubricant sump line 62 to a lubricant heat exchanger (not shown) through lubricant pump line 64 which when cooled, is returned to the clutch assembly 2 through the lubricant return line 66. The input shaft 6 includes a plurality of lubricant flow apertures that distribute the cooling/lubricating lubricant to various sections of the clutch assembly 2. The fluid pump 38 pumps the lubricating lubricant through at least one lubricant feed ports 70 into the lubricant distribution channel 100 (see FIG. 3) for distribution through a plurality of lubricant distribution apertures also (not shown) into the various internal elements of the clutch assembly 2.

Fluid pump 38 functions to provide a pressurized flow of lubricant through the rotating clutch pack 26 and generally, the ball ramp mechanism 19 to provide both a source of cooling and lubrication. Lubricant return line 66 supplies a flow of lubricant from a heat exchanger (not shown) to the pump 38 which pumps lubricant through the interior of the clutch housing 10 and the lubricant is then drained through a separate lubricant sump line 62. The lubricant flows to the clutch assembly 2 through lubricant feed ports 70 and flows into the lubricant distribution channel of the input shaft 6 for distribution to the clutch pack 26 through various lubricant apertures (not shown) which are typical illustrative of a well known method to adequately distribute the flow of lubricant. The lubricant sump line 62 extends into a lubricant supply reservoir such as that of a transmission (not shown) and the lubricant is drawn up into the fluid pump 38 where it is pumped to the heat exchanger through lubricant pump line 64 and flows through the heat exchanger and returns to the clutch assembly 2 through the lubricant return line 66.

Operation

Consider the situation when the torque flow is from the input shaft 6 to the output shaft 8 where both the input and output shafts 5 are rotating clockwise as viewed from the input shaft 6 and with the coil assembly 42 in an energized state. In a certain mode of operation, the activation plate 39 slips relative to the intermediate plate 34 and in another mode of operation the armature 44 slips relative to the intermediate plate 34. In operation, that slippage can switch between the two modes. One such condition, when the clutch assembly 2 is used as a master clutch, is encountered in a typical vehicle acceleration mode. The activation ring 32 is stopped from rotating relative to the input shaft 6 by the first index plate 31A since the first index step 54A contacts the first activation stop 56A formed in the activation ring 32 which is keyed to rotate with the input shaft 6 but allowed to move axially relative thereto. Activation plate 39 is rotationally joined to the input shaft 6 via the index plate 31B which in one mode, is against a stop 52A and the control ring 20 and the activation ring 32 are positioned such that the rolling elements 45A, 45B, 45C are at the bottom of their respective grooves while the second index plate is on its stop 56B but in the opposite direction. Intermediate plate 34 is connected to the output shaft 8 through the clutch hub 14 while the activation ring 32 and the control ring 20 are through the steps 46A, 46B, 54A, 54B and stops 52A, 52B, 56A, 56B keyed to the input shaft 6 via the index plates 31A, 31B. The control ring 20 is allowed to rotate in a clockwise direction relative to the input shaft 6 (and the activation ring 32) as the second control stop 52B moves away from the second index step 46B thereby causing the rolling elements 45A, 45B, 45C to transverse their respective opposing variable depth control and activation grooves 35A, 35B, 35C; 37A, 37B, 37C to increase the separation distance 47. This results in an increase in the clamping load on the clutch pack 26 whenever there is relative rotation between the input shaft 6 and the output shaft 8 up to some maximum value.

Now consider when the torque flow is reversed and directed from the output shaft 8 to the input shaft 6 and the input and output shafts 6, 8 are still rotating clockwise and the coil assembly 42 remains energized. In a certain mode of operation, the activation plate 39 slips relative to the intermediate plate 34 and in another mode of operation the armature 44 slips relative to the intermediate plate 34. In operation, that slippage can switch between the two modes. This condition occurs in a vehicle master clutch application when the vehicle is in a coast mode and the engine is braking the vehicle. The control ring 20 is stopped from rotating relative to the input shaft 6 by the second index plate 31B since the first control step 46B formed in the control ring 20 contacts the second index stop 52B (see FIG. 4). The second index plate 31B is keyed to rotate with the input shaft 6 but is allowing to move axially leftward relative thereto. Axial movement to the right in FIG. 1 is prevented by the snap ring 40. The activation ring 32 is allowed to rotate in a clockwise direction relative to the input shaft 6 (and the control ring 20) as the second activation stop 56B moves away from the second index step 54B (see FIG. 7) thereby causing the rolling elements 45A, 45B, 45C to transverse the opposing variable depth control and activation grooves 35A, 35B, 35C; 37A, 37B, 37C to increase the separation distance 47. This results in an increase in the clamping load on the clutch pack 26 whenever there is relative rotation between the input shaft 6 and the output shaft 8 up to some maximum value.

In general, the input shaft 6 could be any type of rotational input member connected so as to rotate the first and second index plates 31A, 31B and the armature 44 and the drive hub 16. Also, the output shaft 8 could be any type of suitable rotational output member connected to rotate with the clutch hub 14. The clutch assembly 2 of the present invention works even if the input shaft 6 and the output shaft 8 are reversed in function. In the lubrication system of the present invention, the gerotor pump 38 picks up lubricant from the wet or dry sump and pressurizes it for forced flow into the primary lubricant feed ports 70 and into the lubricant distribution channel 100 for flow into the clutch through secondary feed port 71 and into the check valve port 72. The check valve 73 provides a blockage of flow at low rotational speeds to maintain proper lubricant distribution.

Although this invention has been described in its preferred form with a certain degree of particularity, it is understood that the present disclosure of the preferred form has been made only by way of example in that numerous changes in the details and construction and combination and arrangement of parts may be resorted to without departing from the spirit and the scope of the invention as now claimed.

What is claimed is:

1. A lubrication system for a driveline system including a master clutch including a ball ramp mechanism to a load a clutch pack and a transmission comprising:

a lubricant pump disposed within said master clutch;

a lubricant sump attached to said transmission containing a quantity of lubricant;

a lubrication supply tube having a first end disposed within said sump and a second end feeding said lubricant to said lubricant pump where said lubricant is drawn from said sump through said first end of said supply tube, then through said second end of said supply tube into said lubricant pump and into said ball ramp mechanism and into said clutch pack and into said transmission; and a lubricant distribution channel formed in said ball ramp actuator to channel said lubricant from said lubricant pump to said transmission.

2. The lubrication system of claim 1 further comprising at least one lubricant supply port to channel said lubricant from said lubricant pump to said lubricant distribution channel.

3. The lubricant system of claim 1 further comprising a check valve positioned in said lubricant distribution channel for maintaining a minimum level of lubricant pressure in said lubricant distribution channel.

* * * * *